(12) United States Patent
Tezuka

(10) Patent No.: US 7,385,217 B2
(45) Date of Patent: Jun. 10, 2008

(54) RADIATION IMAGE PHOTOGRAPHING SYSTEM

(75) Inventor: Hidetake Tezuka, Hachioji (JP)

(73) Assignee: Konica Corporation (JP)

( * ) Notice: Subject to any disclaimer, the term of this patent is extended or adjusted under 35 U.S.C. 154(b) by 1016 days.

(21) Appl. No.: 10/627,454

(22) Filed: Jul. 25, 2003

(65) Prior Publication Data

US 2004/0032622 A1  Feb. 19, 2004

(30) Foreign Application Priority Data

Aug. 15, 2002  (JP)  ............................. 2002-236936
Aug. 15, 2002  (JP)  ............................. 2002-236943

(51) Int. Cl.
*G01N 23/04* (2006.01)
(52) U.S. Cl. .................................................. 250/586
(58) Field of Classification Search ................. 250/586
See application file for complete search history.

(56) References Cited

U.S. PATENT DOCUMENTS

2002/0063226 A1*  5/2002  Tamakoshi et al. ......... 250/586

FOREIGN PATENT DOCUMENTS

| EP | 0 674 187 | 9/1995 |
|---|---|---|
| EP | 0 849 933 | 6/1998 |
| EP | 0 905 637 | 3/1999 |
| EP | 0 919 857 | 6/1999 |
| EP | 1 103 219 | 5/2001 |

OTHER PUBLICATIONS

European Search Report for EU Patent Appl. No. 03254983.4-1241, mailed Sep. 29, 2004, 3 pgs.

* cited by examiner

*Primary Examiner*—David P. Porta
*Assistant Examiner*—Mindy Vu
(74) *Attorney, Agent, or Firm*—Squire, Sanders & Dempsey L.L.P.

(57) ABSTRACT

A radiation image photographing system with high convenience, efficiency, reliability and expandability wherein when a part of components is broken down, another component can substitute. In the radiation image photographing system, a controller has an operation control information registering section for registering operation control information of the radiation image reading apparatus in the database section, a receiving section for receiving an image read out of the photostimulable phosphor sheet by and outputted from the radiation image reading apparatus, and a display section for displaying the image thereon, a database section has a storing section for storing the operation control information of the radiation image reading apparatus, and a radiation image reading apparatus has an obtaining section for obtaining the operation control information from the database section, and an output section for outputting the image read out of the photostimulable phosphor sheet based on the operation control information.

15 Claims, 8 Drawing Sheets

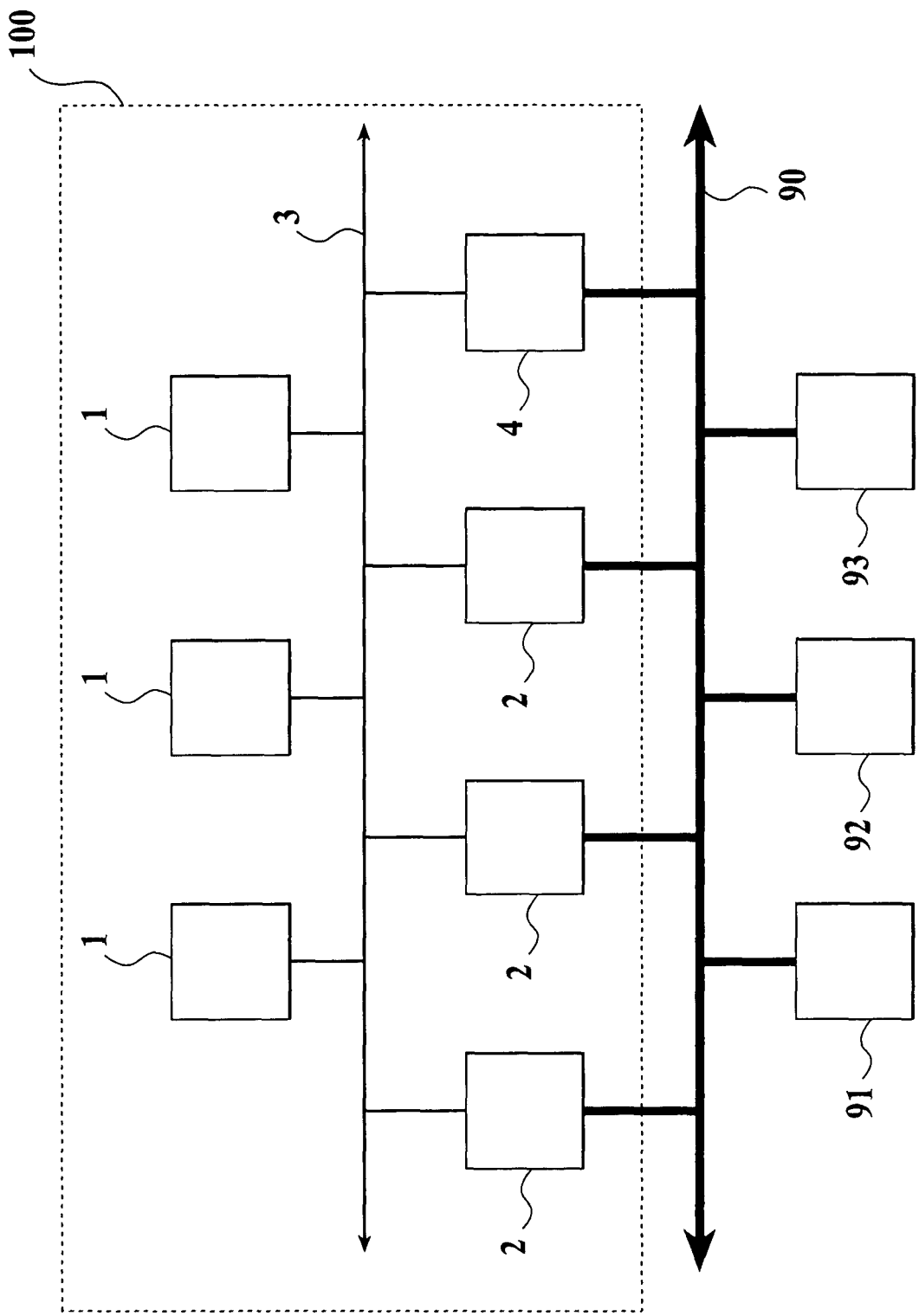

RADIATION IMAGE PHOTOGRAPHING SYSTEM

BACKGROUND OF THE INVENTION

1. Field of the Invention

The invention relates to a radiation image photographing system comprising a radiation image reading apparatus for mainly outputting digital image data, a controller, a database section for mediating operation control information and status information between the radiation image reading apparatus and the controller, or the like.

2. Description of Related Art

These days, it is considered more necessary to make diagnosis efficient and expedite the diagnosis by converting radiation image data generated by photographing a patient into digital data, storing and electrically transmitting the digital data in a hospital. Therefore, also in a photographing field, instead of a conventional screen/film system, a radiation image photographing system for directly outputting digital data by using photostimulable phosphor becomes widely in use.

The radiation image photographing system using photostimulable phosphor is commonly known as CR (Computed Radiography). The radiation image photographing system forms a radiation image by temporarily accumulating radiation energy transmitted through an object in the photostimulable phosphor, obtaining stimulated light by exciting the accumulated radiation energy with a laser beam having predetermined wave length and taking out the stimulated light as an electrical signal by using a photoelectric transducer such as a multiplier or the like.

The radiation image photographing system using photostimulable phosphor is largely classified into two types, one is a stationary type incorporating photostimulable phosphor therein, and another is a movable cassette type using a portable cassette incorporating photostimulable phosphor therein.

Based on FIG. 7 showing a radiation image photographing system of the cassette type using photostimulable phosphor, the radiation image photographing system of the cassette type using photostimulable phosphor will be explained. A cassette 6 is a portable device incorporating a photostimulable phosphor sheet 8 accumulating a part of radiation energy therein. In a radiation photographing room, radiation is irradiated from an X-ray tube 9 toward an object M placed between the X-ray tube 9 and the cassette 6. Then, the photostimulable phosphor sheet 8 incorporated in the cassette 6 accumulates a part of the irradiated radiation energy. Then, when the cassette 6 is set in a radiation image reading apparatus 1, the radiation image reading apparatus 1 reads radiation image information accumulated in the photostimulable phosphor sheet 8 in the cassette 6. Further, a controller 2 comprises a monitor for inputting patient information, photographic part information or the like on an image accumulated in the cassette 6, and confirming the image read by the radiation image reading apparatus 1.

Then, in order to read the radiation image information accumulated in the photostimulable phosphor sheet 8 in the cassette 6, the radiation image reading apparatus 1 irradiates excitation light on the photostimulable phosphor sheet and photoelectrically converts stimulated light excited by excitation light according to the accumulated radiation image information. Then, after A/D conversion, the radiation image reading apparatus 1 outputs the converted data as digital image data. The radiation image reading apparatus 1 is required to perform with high accuracy and is quite expensive.

Further, since the radiation image reading apparatus is required to be able to have a plurality of cassettes for photographing a unit of inspection set therein simultaneously, the radiation image reading apparatus 1 needs to be large.

Further, conventionally, in the above-mentioned radiation image photographing system of the cassette type, the radiation image reading apparatus 1 is integral with its dedicated controller 2, or separately connected with the controller 2 one to one. Therefore, as is often the case, one set of the radiation image reading apparatus 1 and its dedicated controller 2 is provided per a plurality of radiation photographing rooms. However, it is inconvenient to perform radiation photographing operation in a radiation photographing room not having the set. Furthermore, since a time interval between radiation photographing and the input of patient information or photographing information is long, a radiologist sometimes makes a mistake on the input. Further, it takes the radiologist long time to move from the radiation photographing room to the radiation image reading apparatus 1, set the cassette and return to the radiation photographing room after confirming an image, there are problems that the radiologist cannot give a patient an instruction for next photographing during the period, the patient who has done his photographing and already left the radiation photographing room is required to come back because the radiologist finds out that another photographing is necessary for the patient after the radiologist confirms an image, or the like. Therefore, there is an idea that each radiation photographing room in a hospital should have at least one set of the radiation image reading apparatus 1 and its dedicated controller 2. However, this indicates that installation of the set is independent of photographing frequency in the radiation photographing room, and therefore it is uneconomic. Further, installation space is large, and therefore it causes high cost.

Further, in any case, when any one of the radiation image reading apparatus 1 and its dedicated controller 2 is broken down, neither of them can be used.

Given this factor, it is suggested that a system have a plurality of radiation image reading apparatuses 1 and a plurality of controllers 2 connected with the same network for operation.

For example, as shown in FIG. 8, a system 200 comprising a plurality of radiation image reading apparatuses 1 and a plurality of controllers 2 connected through a network 3, sends an image read by one of the radiation image reading apparatuses 1 to one of the registered controllers 2. According to the system 200, although it becomes more convenient for a radiologist or the like, there is a concern of heavy network load and low process ability due to network busy explained hereafter.

In the system 200, when a cassette is set in a radiation image reading apparatus 1-1, the radiation image reading apparatus 1-1 determines whether to send an image to a controller 2-1 in order to determine which controller 2 to send the read image. If a result of the determination is NO, then the radiation image reading apparatus 1-1 proceeds to determine whether to send the image to a controller 2-2. If a result of the determination is YES, the radiation image reading apparatus 1-1 can determine to send the image to the controller 2-2. Therefore, between the radiation image reading apparatus 1-1 and the controller 2-1, communication in both directions is established.

Further, when the radiation image reading apparatuses 1-1 and 1-2 start reading the images simultaneously, since both start determining which controllers 2 to send the read images simultaneously, network becomes busy. Furthermore, when a radiation image reading apparatus 1-3 also starts the process, the network becomes even busier.

Under such a network circumstance, when the controller 2 tries to obtain new photographing order information from a Radiology Information System (RIS) or a Hospital Information System (HIS), due to inquiry from the radiation image reading apparatus 1 to the controller 2 or the like, the network is almost always busy. As a result, response delay may happen.

In order to avoid the above-mentioned circumstance, it is necessary to assume maximum network load and add extra communication capacity based on the assumed maximum network load in advance. However, in order to add the extra communication capacity of the network, capacity investment to the network would be extravagant. Especially, the more numbers of dispersed radiation image reading apparatuses 1 or controllers 2, the more the assumed maximum network load grows exponentially. On the other hand, for example, if only one radiation image reading apparatus 1 is in use, ability of these network facilities is not sufficiently used.

SUMMARY OF THE INVENTION

The present invention is to solve the above-mentioned problems. An object of the present invention is to provide a highly efficient, trustworthy and system-expandable radiation image photographing system or the like wherein even if a part of components is broken down, another component can substitute for it.

In accordance with a first aspect of the present invention, in a radiation image photographing system comprising a controller, a radiation image reading apparatus and a database section which are connected through a network, the controller comprises: an operation control information registering section for registering operation control information of the radiation image reading apparatus in the database section, the operation control information including identification information of the controller, an operational order of the radiation image reading apparatus, and at least one of identification information of a photostimulable phosphor sheet and identification information of the radiation image reading apparatus, a receiving section for receiving an image which is read out of the photostimulable phosphor sheet by and outputted from the radiation image reading apparatus, and a display section for displaying the image received by the receiving section thereon, the database section comprises a storing section for storing the operation control information of the radiation image reading apparatus, and the radiation image reading apparatus comprises: an obtaining section for obtaining the operation control information from the database section by using the identification information of the photostimulable phosphor sheet set in the radiation image reading apparatus as a search key, and an output section for outputting the image read out of the photostimulable phosphor sheet based on the operation control information obtained by the obtaining section to the controller determined by the identification information of the controller included in the operation control information.

In accordance with a second aspect of the present invention, in a radiation image photographing method applicable for a radiation image photographing system comprising a controller, a radiation image reading apparatus and a database section which are connected through a network, the method comprises: registering operation control information of the radiation image reading apparatus in the database section, the operation control information including identification information of the controller, an operational order of the radiation image reading apparatus, and at least one of identification information of a photostimulable phosphor sheet and identification information of the radiation image reading apparatus, outputting an image read out of the photostimulable phosphor sheet by the radiation image reading apparatus from the radiation image reading apparatus to the controller, displaying the image on the controller, storing the operation control information of the radiation image reading apparatus in the database section, obtaining the operation control information from the database section by using the identification information of the photostimulable phosphor sheet set in the radiation image reading apparatus as a search key, and outputting the image read out of the photostimulable phosphor sheet based on the obtained operation control information to a controller determined by the identification information of the controller included in the operation control information.

According to the system of the first aspect or the method of the second aspect of the present invention, even when a photostimulable phosphor sheet having its own identification information included in the operation control information registered by any one of controllers is set in any one of radiation image reading apparatuses, it is possible to search the operation control information uniquely from the database section based on the identification information of the photostimulable phosphor sheet which can be obtained by the radiation image reading apparatus. Therefore, since it is possible to set the photostimulable phosphor sheet having identification information registered by one controller in any one of a plurality of radiation image reading apparatuses, the radiation image reading apparatus can have fewer numbers of sockets for setting the photostimulable phosphor sheets. Consequently, it is possible to photograph a radiation image comparatively inexpensively. Further, since it is possible to set a plurality of cassettes in the plurality of radiation image reading apparatuses diversely, it is possible to improve operational efficiency. Also, since the plurality of radiation image reading apparatuses read image data parallelly, transaction ability improves.

Preferably, in the system of the first aspect of the present invention, the radiation image reading apparatus further comprises a status information registering section for registering at least one of a progress state of operation, success or failure of the operation, and a reason of failure of the operation as status information in the database section when the radiation image reading apparatus executes the operation based on the operation control information, and the radiation image reading apparatus registers the status information in the database section and gives the controller the search order of the database section.

Preferably, the method of the second aspect of the present invention further comprises registering at least one of a progress state of operation, success or failure of the operation, and a reason of failure of the operation as status information in the database section when the radiation image reading apparatus executes the operation based on the operation control information, and registering the status information in the database section and giving the controller the search order of the database section.

Preferably, in the system of the first aspect of the present invention, the obtaining section of the radiation image reading apparatus obtains the operation control information from the database section by using the identification information of the radiation image reading apparatus as the search key upon a search order of the database section by the controller, and makes the radiation image reading apparatus operable based on the operation control information.

More preferably, the radiation image reading apparatus further comprises a status information registering section for registering at least one of a progress state of operation, success or failure of the operation, and a reason of failure of the operation as status information in the database section when the radiation image reading apparatus executes the operation based on the operation control information according to the search order by the controller, and the radiation image reading apparatus registers the status information in the database section and gives the controller the search order of the database section.

Preferably, in the method of the second aspect of the present invention, the obtaining the operation control information from the database section includes obtaining the operation control information from the database section by using the identification information of the radiation image reading apparatus as the search key upon a search order of the database section, and making the radiation image reading apparatus operable based on the operation control information.

More preferably, the above-mentioned method further comprises registering at least one of a progress state of operation, success or failure of the operation, and a reason of failure of the operation as status information in the database section when the radiation image reading apparatus executes the operation based on the operation control information according to the search order by the controller, and registering the status information in the database section and giving the controller the search order of the database section.

According to the system or the method, even when the operation control information such as a halt order, a start-up order or the like including the identification information of a certain radiation image reading apparatus is registered by any one of the controllers, it is possible to search the operation control information uniquely from the database section based on the own identification information of the radiation image reading apparatus. Therefore, since the controller gives at least one of all the radiation image reading apparatuses connected to a network a search order of searching database, it is possible that the radiation image reading apparatus carries out desired operation. Also, by registering status information of a side of the radiation image reading information in the database and giving at least one of all the controllers connected to the network a search order of searching database, it is possible to notify the controller of the status. Consequently, it is possible to reduce chances of direct communication of both the controller and the radiation image reading apparatus on the network, and prevent a waiting state due to both the operational situations, especially due to a high load process situation. As a result, since it is possible to extremely simplify the communication on the network, operational reliability of the system drastically improves.

Preferably, in the above-mentioned system, the status information includes a status indicating that the radiation image reading apparatus already has searched the operation control information as the progress situation of the operation.

Preferably, in the above-mentioned method, the status information includes a status indicating that the radiation image reading apparatus already has searched the operation control information as the progress situation of the operation.

According to the system or the method, it is possible to see whether the operation control information which the controller has registered in the database section already has been transmitted to the radiation image reading apparatus. As a result, it is possible for a user to recognize a progress situation of the registered operation control information.

Preferably, in the above-mentioned system, the operation control information registering section can register only operation control information including identification information of a photostimulable phosphor sheet different from the identification information of the photostimulable phosphor sheet included in the operation control information which has already been registered in the database section based on the status information.

Preferably, in the above-mentioned method, the registering identification information of the controller, an operational order of the radiation image reading apparatus, and at least one of identification information of a photostimulable phosphor sheet and identification information of the radiation image reading apparatus as operation control information in the database section is possible only when operation control information includes identification information of a photostimulable phosphor sheet different from the identification information of the photostimulable phosphor sheet included in the operation control information which already has been registered in the database section based on the status information.

According to the system or the method, when the controller registers the operation control information of the radiation image reading apparatus including the identification information of the photostimulable phosphor sheet in the database, it is possible to confirm whether the operation control information of the radiation image reading apparatus including the identification information of the identical photostimulable phosphor sheet already has been registered and the operation control information already has been searched. As a result, since it is possible to prevent photographing more than once on one identical photostimulable phosphor sheet which has not been read or warn a user of photographing more than once, it is possible to provide a system with higher safety.

Preferably, in the above-mentioned system, the obtaining section can obtain operation control information other than the operation control information which already has been searched by the radiation image reading apparatus from the database section based on the status information.

Preferably, in the above-mentioned method, the obtaining the operation control information from the database section is possible only when operation control information is other than the operation control information which already has been searched by the radiation image reading apparatus based on the status information.

According to the system or the method, since the operation control information is uniquely determined according as the radiation image reading apparatus searches the operation control information, the search becomes more efficient. As a result, it is possible to improve operational reliability and a performance of the system Preferably, in the system of the first aspect of the present invention, the identification information of the photostimulable phosphor sheet includes barcode information attached to at least one of the photostimulable phosphor sheet and a cassette covering the photostimulable phosphor sheet.

Preferably, in the method of the second aspect of the present invention, the identification information of the photostimulable phosphor sheet includes barcode information attached to at least one of the photostimulable phosphor sheet and a cassette covering the photostimulable phosphor sheet.

According to the system or the method, since a barcode system, which is generally inexpensive and highly reliable, is used for the identification information of the photostimulable phosphor sheet and detecting the identification information, it is possible to have a system with low cost and improve its reliability.

Preferably, in the system of the first aspect of the present invention, the identification information of the photostimulable phosphor sheet is registration turn to the database section by the controller, instead of the identification information of the photostimulable phosphor sheet.

Preferably, in the method of the second aspect of the present invention, the identification information of the photostimulable phosphor sheet is registration turn to the database section by the controller, instead of the identification information of the photostimulable phosphor sheet.

According to the system or the method, when a system structure wherein one or a plurality of radiation image reading apparatuses are connected per one controller is used, since it is possible to omit operation of registering the identification information of the photostimulable phosphor sheet by a side of the controller, it is possible to build an easy-to-use system.

Preferably, in the system of the first aspect of the present invention, the operation control information includes a reading order of the photostimulable phosphor sheet to the radiation image reading apparatus and a condition for reading the image from the photostimulable phosphor sheet, the condition including at least one of reading resolution, reading sensitivity, output density gradation and a data processing type.

Preferably, in the method of the second aspect of the present invention, the operation control information includes a reading order of the photostimulable phosphor sheet to the radiation image reading apparatus and a condition for reading the image from the photostimulable phosphor sheet, the condition including at least one of reading resolution, reading sensitivity, output density gradation and a data processing type.

According to the system or the method, it is possible to obtain a desirable image in view of reading resolution, reading sensitivity, output density gradation and the data processing as an image of a result that a user of the controller has the radiation image reading apparatus read the photostimulable phosphor sheet.

Preferably, in the system of the first aspect of the present invention, the operation control information includes at least one of a start-up order, a halt order, an order of generating a correction coefficient for a data processing and an order of changing an operational program, to the radiation image reading apparatus.

Preferably, in the method of the second aspect of the present invention, the operation control information includes at least one of a start-up order, a halt order, an order of generating a correction coefficient for a data processing and an order of changing an operational program, to the radiation image reading apparatus.

According to the system or the method, although the start-up order, the halt order, the order of generating the correction coefficient or the order of changing the operational program has no relation to reading the photostimulable phosphor sheet, it is possible to achieve the order as operation using the database section through the network.

Preferably, the system of the first aspect of the present invention comprises a plurality of controllers, wherein the database section is incorporated in at least one of the plurality of controllers.

According to the system, since there is a plurality of controllers, it is possible to place the controller near a location for radiation photographing. Therefore, a radiologist can input patient information or photographing information in relation to radiation photographing and reading, confirm the image and change the image process near the location for radiation photographing. In other words, it is possible to provide the radiologist or the like an environment which has high operational efficiency and is easy to be operated. Further, since the database section is incorporated in the controller, it is possible to reduce an area for placing whole the system, reduce installation cost and obtain high expandability.

Preferably, the system of the first aspect of the present invention comprises a plurality of controllers and a plurality of database sections, wherein the plurality of database sections are incorporated in a number of controllers among the plurality of controllers corresponding to a number of the plurality of database sections, and the plurality of database sections exchange and share database information in a predetermined cycle.

According to the system, it is possible to obtain information of the database section from any one of the controllers independent of network load. As a result, even when a certain database section is broken down, it is possible for the system to keep functioning.

Preferably, in the above-mentioned system, when a database section operating as a master of the plurality of database sections breaks down, any one other than the database section of the plurality of database sections operates as a master.

According to the system, even when the controller incorporating the database section therein is broken down, a controller incorporating another database sharing database information until the breakdown can substitute for the broken controller incorporating the database without delay. As a result, it is possible to build a highly reliable system.

Preferably, in the system of the first aspect of the present invention, the database section is incorporated in the radiation image reading apparatus.

According to the system, even if the system wherein the controller always needs to execute a high-load image process is used, since the radiation image reading apparatus incorporates the database section therein, it is possible to have high performance as a whole system.

Preferably, in the system of the first aspect of the present invention, the database section is incorporated in an external apparatus other than the controller or the radiation image reading apparatus.

According to the system, since the database section for controlling system operation is not incorporated in the controller or the radiation image reading apparatus, which are considered to be broken down often relatively because they have a human-machine interface, but in a dedicated server, it is possible to improve operational reliability when a comparatively large-sized system is built.

Preferably, the system of the first aspect of the present invention comprises a plurality of database sections, wherein the plurality of database sections are incorporated in a plurality of external apparatuses corresponding to a number of the plurality of database sections other than the controller nor the radiation image reading apparatus, and the plurality of database sections exchange and share database information in a predetermined cycle.

According to the system, even when a dedicated server machine incorporating the database section therein is broken down, it is possible for the system to keep functioning. As a result, it is possible to improve operational reliability of the system.

Preferably, in the above-mentioned system, when a database section operating as a master of the plurality of database sections breaks down, any one other than the database section of the plurality of database sections operates as a master.

According to the system, even when a dedicated server machine incorporating the database section therein is broken down, a dedicated server machine incorporating another database section sharing database information until the breakdown can substitute for the broken server machine incorporating the database section therein. As a result, it is possible to build a system with higher reliability.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 1 is a view showing an exemplary structure of a radiation image photographing system 100 in a first embodiment of the present invention.

EMBODIMENTS OF THE INVENTION

Figures 2A, 2B:
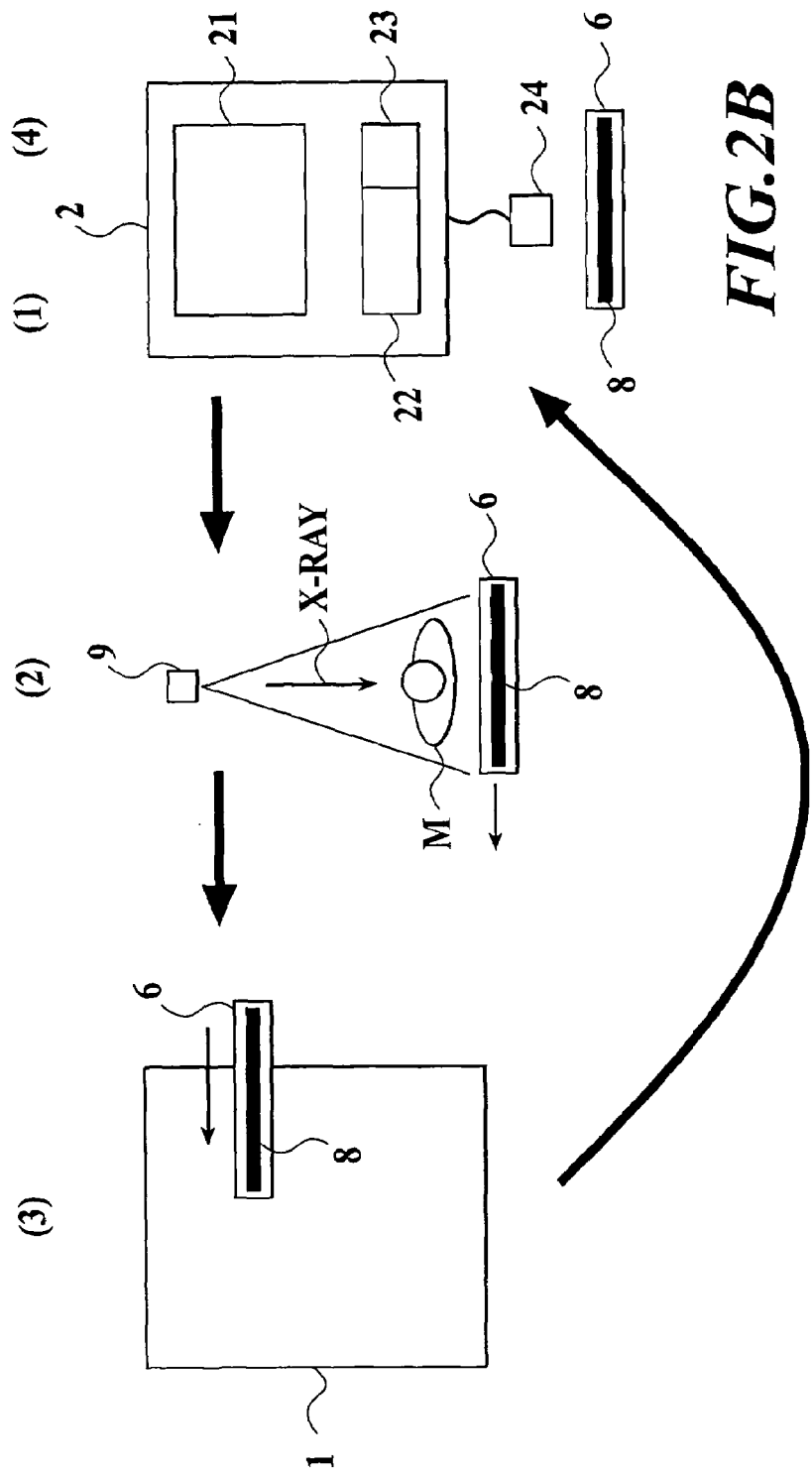
FIG. 2A is a view showing operation of the radiation image photographing system 100.
FIG. 2B is a view showing a cassette 6.

Hereinafter, an embodiment of the present invention will be explained with reference to figures. The present invention is not limited to the following embodiment. Here, although there are explanations of meanings of words written hereafter, it is to explain the meanings of the word only in the embodiment. Therefore, meanings of words in the present invention is not limited to the meanings of words written as follows.

First Embodiment

In a radiation image photographing system 100 of the present embodiment, as shown in FIG. 1, a plurality of radiation image reading apparatuses 1, a plurality of controllers 2 and a server 4 are connected each other through a network 3. Further, the plurality of controllers 2 are connected to a DICOM network 90. To the DICOM network 90, an image recording apparatus 91 such as a laser imager or the like, an image diagnosis apparatus 92, an image filing apparatus 93 or the like can be connected. The image recording apparatus 91 provides a doctor a visualized diagnosis image by outputting image data outputted from the controller 2 onto a film. The image diagnosis apparatus 92 provides the doctor the visualized diagnosis image by displaying the image data outputted from the controller 2 on a monitor. The image filing apparatus 93 stores the image data outputted from the controller 2. The image data stored in the image filing apparatus 93 can be outputted to the image recording apparatus 91 or the image diagnosis apparatus 92 according to its necessity.

First, the radiation image photographing system 100 of the present embodiment will be explained with reference to FIG. 2A and FIG. 2B. FIG. 2A is a view showing process conditions (1)-(4) of the radiation image photographing system 100.

Condition (1): As shown in FIG. 2B, a barcode 62 corresponding to an ID number (hereafter, the ID number is called a sheet ID number) for identifying a photostimulable phosphor sheet 8 incorporated in a cassette 6 is attached to a covering of the cassette 6. Further, in this embodiment, although a structure wherein the sheet ID number is identified with the barcode 62 is explained, for example, with radio technology using an electromagnetic wave, a micro wave or the like, a noncontact ID label (S-Label) or a device called TIRIS having a readable code written therein may be used instead of the barcode 62. When such label is used for reading the code (the sheet ID number) with radio technology as mentioned above, it is not necessary to attach the label to the covering of the cassette 6, but for example, the label may be attached to a backside of the photostimulable phosphor sheet 8. In this case, it is better to attach another label on which an ID number is written for identifying the photostimulable phosphor sheet 8 to the covering of the cassette 6.

A radiologist goes to the front of the controller 2 with the cassette 6 which is to be used for photographing and inputs an operator ID number by using an operator ID input unit 23 of the controller 2. In view of information accuracy, although it is the most appropriate as the operator ID input unit 23 to use an input section such as a fingerprint detector, a voiceprint detector or the like capable of identifying identification information based on operator's own physical feature such as a fingerprint, a voiceprint or the like, an ID card reader for reading an ID card, a barcode reader for reading a barcode label or an input section such as a signal receiver or the like for receiving a signal dispatched from a portable dispatcher (it is convenient to use the ID card, the barcode label or the signal dispatcher since the operator can always carry it with himself), a keyboard, a touch panel or the like may be used as another method. Further, an input unit 22 as follows may also function as the operator ID input unit 23. Further, in order to omit trouble in inputting for every time, normally, when one controller 2 is used by only one person, it is convenient to set the first input data as a default. Further, ID numbers of radiologists may be registered at the controller 2 in advance so as to select any one of the registered ID numbers with a keyboard, a touch panel or the like later.

Then, in order to register the sheet ID number at the controller 2, the radiologist have the sheet ID number read by a barcode reader 24 of the controller 2 from the barcode 62 of the cassette 6, or inputs the sheet ID number at the input unit 22 of the controller 2.

Further, the radiologist inputs patient information, the patient to be photographed with the cassette 6, and photographing information necessary at the time of photographing the patient through the input unit 22. Here, the patient information comprises a patient name, an age, a sex, a date of birth, a patient ID number for identifying the patient or the like, Further, the photographing information comprises a photographic part (a part of an object M to be photographed), photographing method (information for specifying a photographing direction such as PA:Posteroanterior Projection, AP:Anteroposterior Projection, LAT:Lateral Radiography, oblique Radiography or the like or a technique) or the like. The photographing information is not only used as a photographing record of the patient, but as an image process condition of read image data, especially an image process parameter for determining a gradation transformation process condition.

When the photographing information is determined, the radiation image reading apparatus 1 is supposed to automatically select a reading condition such as reading sensitivity, reading resolution (sampling pitch) or the like, corresponding to the photographing information.

Here, reusable information among such information may be stored as a default value in the controller 2 to simplify input from next time. Further, if the photographing information or the patient information is registered at the controller 2 in advance, these information may be displayed as a list on a display unit 21 in order for the radiologist to select necessary information from the displayed list.

The controller 2 primarily stores the sheet ID number and the operator ID number inputted through the barcode reader 24 or the input unit 22, and a set of information such as the photographing information, the patient information (hereafter, this set of information is called accompanying information), the reading condition or the like registered along with and related to the mentioned ID numbers therein.

If the sheet ID number, the operator ID number or accompanying information displayed on the display unit 21 is incorrect, the radiologist inputs a reinput order of the input unit 22. If it is correct, the radiologist proceeds to the next input operation. Then, when the input operation for all the cassettes 6 to be used for photographing is completed, the radiologist inputs an input complete order. When the reinput order is inputted in the input unit 22, the controller 2 clears primarily stored information such as the sheet ID number or the like, and waits for reinput.

Further, when the next sheet ID number or the input complete order is inputted, the controller 2 sends the primarily stored information, the sheet ID number, the operator ID number and the accompanying information to the server 4 along with the ID number of the controller 2 (hereafter, it is called a controller ID number).

When the server 4 receives these information, the server 4 adds a photographed image unique ID number that is unique to each photographed image and registers it as a record in a photographing database.

As mentioned above, when the sheet ID number is registered by the controller 2, the photographing information corresponding to the cassette 6 is registered therewith. Further, as follows, when the controller 2 receives image data with the sheet ID number, the controller 2 applies an image process on the image data received with the sheet ID number based on the photographing information having sheet ID number identical to the sheet ID number and outputs the processed image data. Therefore, when the photographing information is registered after the image is read from the photostimulable phosphor sheet 8 of the cassette 6, it is possible to avoid a mistake in registering the photographing information. As a result, it is possible to apply a correct image process on the image.

Further, when the sheet ID number is registered by the controller 2, the operator ID number and the controller ID number corresponding to the cassette 6 are registered as well. Therefore, it is possible to utilize these information later.

Here, the radiation image reading apparatus 1 also has an ID number (an apparatus ID number) for identifying each radiation image reading apparatus 1.

Condition (2): When a set of operation such as the registration of various types of ID numbers, the input of the accompanying information or the like is completed, the radiologist places a portion of the object M, the portion to be photographed with radiation, between the X-ray tube 9 and the cassette 6 (normally, the cassette 6 is applied to the object M), and irradiates radiation by operating a radiation generation control apparatus 10 of the X-ray tube 9. Then, a part of radiation energy irradiated from the X-ray tube 9 and passing through the object M is temporarily accumulated in the photostimulable phosphor sheet 8 incorporated in the cassette 6.

Condition (3): When radiation photographing to the patient as the object M is completed, an assistant sets the cassette 6 in which the patient is photographed in the radiation image reading apparatus 1. In this case, the cassette 6 can be set in any one of the radiation image reading apparatuses 1. Further, a plurality of the cassettes 6 may be set in a plurality of the radiation image reading apparatuses 1 diversely.

When the cassette 6 is set in the radiation image reading apparatus 1, the radiation image reading apparatus 1 reads the sheet ID number from the barcode 62 of the cassette 6, and have the server 4 search a record corresponding to the sheet ID number from the photographing database. The server 4 searches the record corresponding to the sent sheet ID number from the photographing database, obtains the latest record among the corresponding records and returns information of the latest record to the radiation image reading apparatus 1. Then, the radiation image reading apparatus 1 reads radiation image information accumulated in the photostimulable phosphor sheet 8 of the cassette 6 based on the reading condition (reading sensitivity, reading resolution or the like) written in the returned information of the record. In other words, the radiation image reading apparatus 1 irradiates excitation light to the photostimulable phosphor sheet 8, photoelectrically converts stimulated light emitted from the photostimulable phosphor sheet 8 according to the radiation image information accumulated by the irradiated excitation light, and obtains A/D converted digital image data (hereafter, for ease, it is called image data). Then, the radiation image reading apparatus 1 sends the obtained image data with the information of the record sent from the server 4 to the controller 2 having the controller ID number returned from the server 4.

When reading the image data is completed, the radiation image reading apparatus 1 erases energy remaining in the photostimulable phosphor sheet 8 and puts the photostimulable phosphor sheet 8 back in the cassette 6 for making the cassette 6 ready to be picked up. The assistant returns the cassette 6 from which the image information is read to the radiation photographing room for next photographing.

As mentioned above, in the embodiment of the present invention, since registered photographing information automatically determines the reading condition of the photostimulable phosphor sheet 8 and the determined reading condition is stored corresponding to the sheet ID number, the radiation image reading apparatus 1 can search the reading condition based on the read sheet ID number and read the image data from the photostimulable sheet 8 of the cassette 6 based on the obtained reading condition. As mentioned, since it is possible to read the image data in an appropriate reading condition by only registering the photographing information at the controller 2, it is possible to obtain the most appropriate image data having good image quality to the photographing condition.

Condition (4): The radiologist performs the confirming operation of received image data. First, while the controller 2 receives image data from the radiation image reading apparatus 1, the controller 2 generates a reduced image of the image data and sequentially displays each reduced image on the display unit 21. Further, the controller 2 displays the sheet ID number in relation to the received image data, the apparatus ID number of the radiation image reading apparatus 1 which has sent the image data and other accompanying information with the image data on the display unit 21. Contents of these information displayed with the image data (reduced image data) can be chosen by a user in advance.

When all the image data is received, the controller 2 applies an image process on the generated reduced image data, the image process such as a nonlinear gradation transformation process or the like based on the image process condition determined by the photographing information corresponding to the image data, and redisplays the processed image data on the display unit 21. The radiologist confirms the redisplayed image, and if necessary, it is possible to reapply the image process on the reduced image data in a modified image process condition.

Further, the controller 2 notifies the server 4 of the sheet ID number corresponding to the received image data. Based on the advice, the server 4 adds information "image transferred" to the corresponding record in photographing database.

The controller 2 searches information temporarily stored in the photographing database in the server 4 or the controller 2 based on the patient ID number in order to confirm whether all the image data of the sheet ID number having the corresponding patient ID number is returned to the controller 2. When all the image data of the sheet ID number having the corresponding patient ID number is returned to the controller 2, the controller 2 displays information that indicates all the image data for the patient is received on the display unit 21.

It is difficult to determine whether reading all the cassettes 6 for one patient is completed from a view of an operational circumstance of the radiation image reading apparatus 1. However, when the controller 2 at which the sheet ID number is registered receives all the images read from a plurality of cassettes 6 for the patient, the controller 2 displays the information that indicates all the image data for the patient is received. Therefore, the operator can proceed to a next operation with security.

Further, in the embodiment of the present invention, it is possible to arrange a display position or an output turn of the image data in predetermined turn. The arrangement may be either done automatically or specified by a user. If the turn is automatically arranged, it is necessary to configure the arrangement turn in advance. For example, if it is configured to be arranged in turn of registration of the sheet ID number, even though the cassette 6 is set in the radiation image reading apparatus 1 in random turn or the controller 2 receives the image data in random turn, the display position of the image is always determined based on the registration turn. As a result, it is possible to avoid confusion on display.

Further, in the embodiment of the present invention, if sheet ID numbers of a plurality of cassettes 6 for photographing one patient are registered by one controller 2, when the plurality of cassettes 6 in which the patient is photographed are set in a plurality of the radiation image reading apparatuses 1 diversely, images read by the plurality of radiation image reading apparatuses 1 are automatically returned to the controller 2 by which their sheet ID numbers have been registered. Therefore, although image data is returned from the different radiation image reading apparatus 1, it is possible to handle image data for one patient altogether.

When the radiologist finishes confirming the image, the radiologist inputs image confirmation. When the image confirmation is inputted, in the image process condition carried out for the last time on the reduced image displayed on the display unit 21, the image process is also applied on unreduced image data (received original image data) and the processed image data is temporarily stored in the controller 2. Then, either the processed image data or the image data before the image process in the image process condition is sent to the image recording apparatus 91, the image diagnosis apparatus 92, the image filing apparatus 93 or the like through the DICOM network 90 along with other accompanying information and ID information according to DICOM communication protocol.

Further, when the image confirmation is inputted, a code that indicates "already processed" is added to the record of the corresponding sheet ID number in the photographing database in the server 4.

Figure 3:
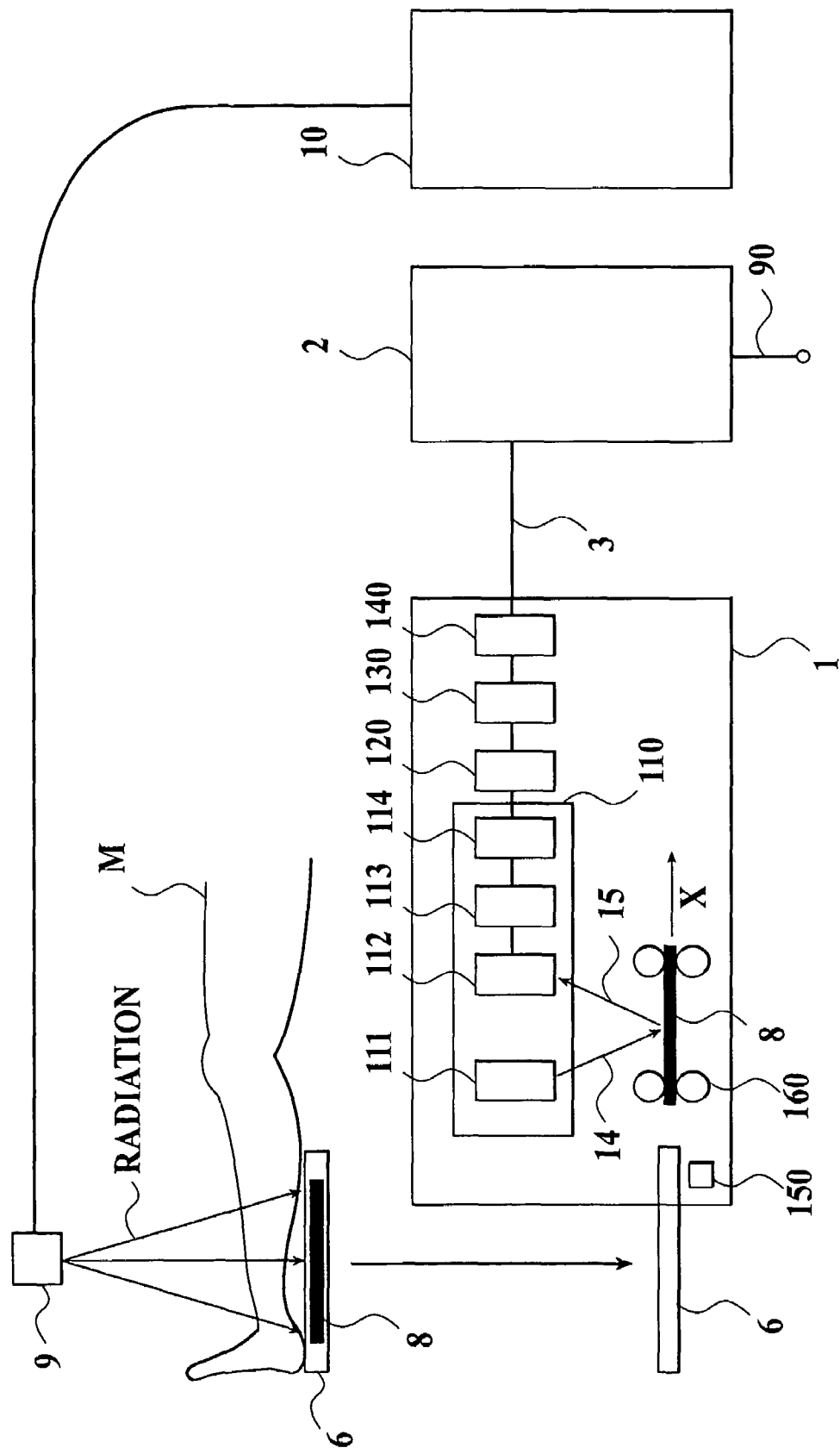
FIG. 3 is a view showing a radiation image reading apparatus 1 of the radiation image photographing apparatus 100.

Next, the radiation image reading apparatus 1 will be explained in detail with reference to FIG. 3.

After radiation photographing is completed, when the cassette 6 is set in the radiation image reading apparatus 1, a barcode reader 150 in the radiation image reading apparatus 1 reads the sheet ID number from the barcode 62 of the cassette 6. Based on the sheet ID number, as mentioned above, the server 4 searches for obtaining the reading condition (reading sensitivity, reading resolution or the like) and the controller ID number to which the image data is returned. According to the value of the reading sensitivity, sensitivity of a photoelectric reading unit 112 is set. According to the value of the reading resolution, conveyance speed of a conveyance unit 160 or a sampling pitch of an A/D converter 113 is set.

Further, when the cassette 6 is set in the radiation image reading apparatus 1, the photostimulable phosphor sheet 8 is drawn from the cassette 6. Then, while the conveyance unit 160 conveys the photostimulable phosphor sheet 8 in a direction of X, which is a sub-scanning direction, the reading unit 110 reads image data accumulated and maintained in the photostimulable phosphor sheet 8.

Concretely, the reading unit 110 comprises an excitation light generating unit 111, the photoelectric reading unit 112 and the A/D converter 113. While the conveyance unit 160 conveys the photostimulable phosphor sheet 8 in the sub-scanning direction, the excitation generating unit 111 scans the photostimulable phosphor sheet 8 with excitation light 14 in an orthogonal direction to the sub-scanning direction (in a main-scanning direction).

When the excitation light 14 is applied on the photostimulable phosphor sheet 8, energy accumulated in the photostimulable phosphor sheet 8 is excited into luminescence as stimulated light 15. Then, the photoelectric reading unit 112 converges and converts the stimulated light 15 into an electric signal. Then, a logarithmic transformer 114 logarithmically transforms the electric signal (by this transformation, the electric signal is converted from an electric signal linear to light intensity of the stimulated light 15 to an electric signal logarithmically linear to the light intensity of the stimulated light 15, that is an electric signal linear to density). Further, the A/D converter 113 converts the transformed signal to a digital signal.

Next, a data processing unit 120 applies a compensation process peculiar to the reading unit 110 or the photostimulable phosphor sheet 8 (such as shading compensation due to the photoelectric reading 112, unevenness compensation due to the excitation generating unit 111, sensitivity unevenness compensation due to the photostimulable phosphor sheet 8 or the like) on image data outputted from the reading unit 110. After that, the image data is primarily stored in the primary storage 130 in order. Then, when reading of the image data is completed (or while the image data is being read), a communication unit 140 sends the image data to the controller 2 having the controller ID number returned from the server 4 through the network 3.

Here, the image data sent to the controller 2 has pixel values linear to logarithmic values of light intensity of the stimulated light 15, and therefore it has gradation characteristic which is not appropriate as it is for diagnosis (in most cases, it is impossible to use for diagnosis). In order to convert the image data into image data capable of being used for diagnosis, generally it is necessary to execute a nonlinear gradation conversion process. In this embodiment, this process is carried out by the controller 2. As mentioned above, in this embodiment, the image data with gradation characteristic remaining inappropriate for diagnosis is returned from the radiation image reading apparatus 1 to the controller 2.

Since the process condition of the nonlinear gradation conversion process differs depending on the photographic part, the photographing direction or the like, it is necessary to prepare algorithm for each photographic part and each photographing direction. Further, besides that, since it is necessary to prepare algorithm for automatically detecting an aperture of an exposure field or an object area at the time of photographing, the algorithm of the nonlinear gradation conversion process generally has very complicated structure.

Since an environment where it is possible to execute such complicated image process algorithm at high speed (hereafter, it is called an image process environment) is very expensive, it is very uneconomical to build the image process environment in both the radiation image reading apparatus 1 and the controller 2. Since this embodiment is to provide an environment where the radiologist can confirm the image, modify the image process condition and the image process can be carried out again under the modified image process condition, the side of the controller 2 needs to have the image process environment. Therefore, it is better to have a structure wherein the image process is not carried out at the side of the radiation image reading apparatus 1 but is carried out only at the side of the controller 2.

However, even if the system has a structure wherein the image process can be carried out by the radiation image reading apparatus 1, it does not depart from essence of the present invention except for in cost perspective.

Next, the controller 2 will be explained in more detail with reference to FIG. 2.

The controller 2 comprises the display unit 21 for displaying various information and read images, the input unit 22 for the radiologist or the like to input the order, the operator ID input unit 23 for inputting the ID number of the operator such as the radiologist or the like, and the barcode reader 24 for reading the barcode 62 of the cassette 6. Further, the controller 2 is connected to the server 4 and a plurality of the radiation image reading apparatuses 1 through the network 3. Further, the controller 2 can be connected to the image recording apparatus 91, the image diagnosis apparatus 92, the image filing apparatus 93 or the like through the DICOM network 90.

The input unit 22 can apply a keyboard, a touch panel, an audio input apparatus or the like, and not limited to it.

Further, the controller 2 and the server 4 can be connected to a Hospital Information System (HIS) or a Radiology Information System (RIS). In this case, preferably, the controller 2 obtains the patient information, the photographing information or the like from the HIS or the RIS online. Further, it is also acceptable to have a patient carry a portable storage medium storing the above-mentioned information, and provide a storage medium reading apparatus for the controller 2 to read information such as the patient information, the photographing information or the like from the portable storage medium carried by the patient. As such portable storage medium and storage medium reading apparatus, a barcode and a barcode reader, a magnetic card and a magnetic card reader, an IC card and an IC card reader or the like can be used, and the portable storage medium and the storage medium reading apparatus are not limited to them.

Further, based on the patient ID number, the controller 2 may search the corresponding data from the HIS or the RIS. In this case, it is also acceptable to have the patient carry the portable storage medium storing the patient ID number, and provide the storage medium reading apparatus for the controller 2 to read these information from the portable storage medium carried by the patient. Further, not only the mentioned method, but also the patient may input his patient ID number through the input unit 22 into the controller 2. Further, it is also acceptable that information peculiar to a patient such as a fingerprint, a voiceprint or the like is stored in the HIS or the RIS in advance, and the controller 2 searches data corresponding to the detected fingerprint or voiceprint from the HIS or the RIS by providing a fingerprint detector, a voiceprint detector or the like for the controller 2.

Further, as the display unit 21 of the controller 2, for example, a section capable of displaying character information or image information such as a CRT display, a liquid crystal display or the like may be used. As contents displayed on the display unit 21, the apparatus ID number for identifying the radiation image reading apparatus 1 which has obtained image data, the operator ID number, the patient information, the photographing information, the reading condition, a radiation photographing condition obtained from the radiation generating control apparatus 10 of the X-ray tube 9 (for example, tube voltage of the X-ray tube, radiation dose of the X-ray tube or the like), the pixel number or the matrix size of the image data, the bit number per one pixel of the image data, the type of the image process, the image process parameter, information such as contents of the compensation process or the like, the image of the photographed image data, or the like can be listed. The contents are not limited to the above-described information or the like.

Further, the photographic part may be selected in two steps: a major classification and a minor classification. The major classification is a rough breakdown based on a major structure part of a human body. In this case, as the major classification, for example, "HEAD", "CHEST", "ABDOMEN", "ARM", "LEG", "VERTEBRAE", "PELVIS" or the like can be used. Further, the minor classification is a more precise breakdown of each major classification part. For example, when "ARM" is selected as the major classification, "SHOULDER JOINT", "SHOULDER BLADE", "ACROMIOCLAVICULAR JOINT", "HUMERUS", "ELBOW JOINT", "FOREARM BONE", "WRIST JOINT", "CARPALS", "PHALANGES" or the like can be used as the minor classification.

Further, the photographing direction is generally a photographing direction toward a human body, but not limited to it. As a representative example of such photographing direction, PA (Posteroanterior Projection), AP (Anteroposterior Projection), LAT (Lateral radiography), Oblique Radiography or the like can be listed.

Further, as the type of the image process executed by the controller 2, the gradation conversion process for converting gradation of the image data, a frequency process for converting frequency characteristic of the image data, a dynamic range compress process for compressing dynamic range of the image data or the like can be listed, but not limited to it.

Especially, in this embodiment, since the system is structured that the image data having pixel values logarithmically linear to light intensity of the stimulated light 15 is sent from the radiation image reading apparatus 1 to the controller 2, it is fundamental that the controller 2 can execute the nonlinear gradation conversion process.

Next, an image process processed by a radiation image photographing system 100 will be explained with reference to a flow chart shown in FIG. 4.

Figure 4:
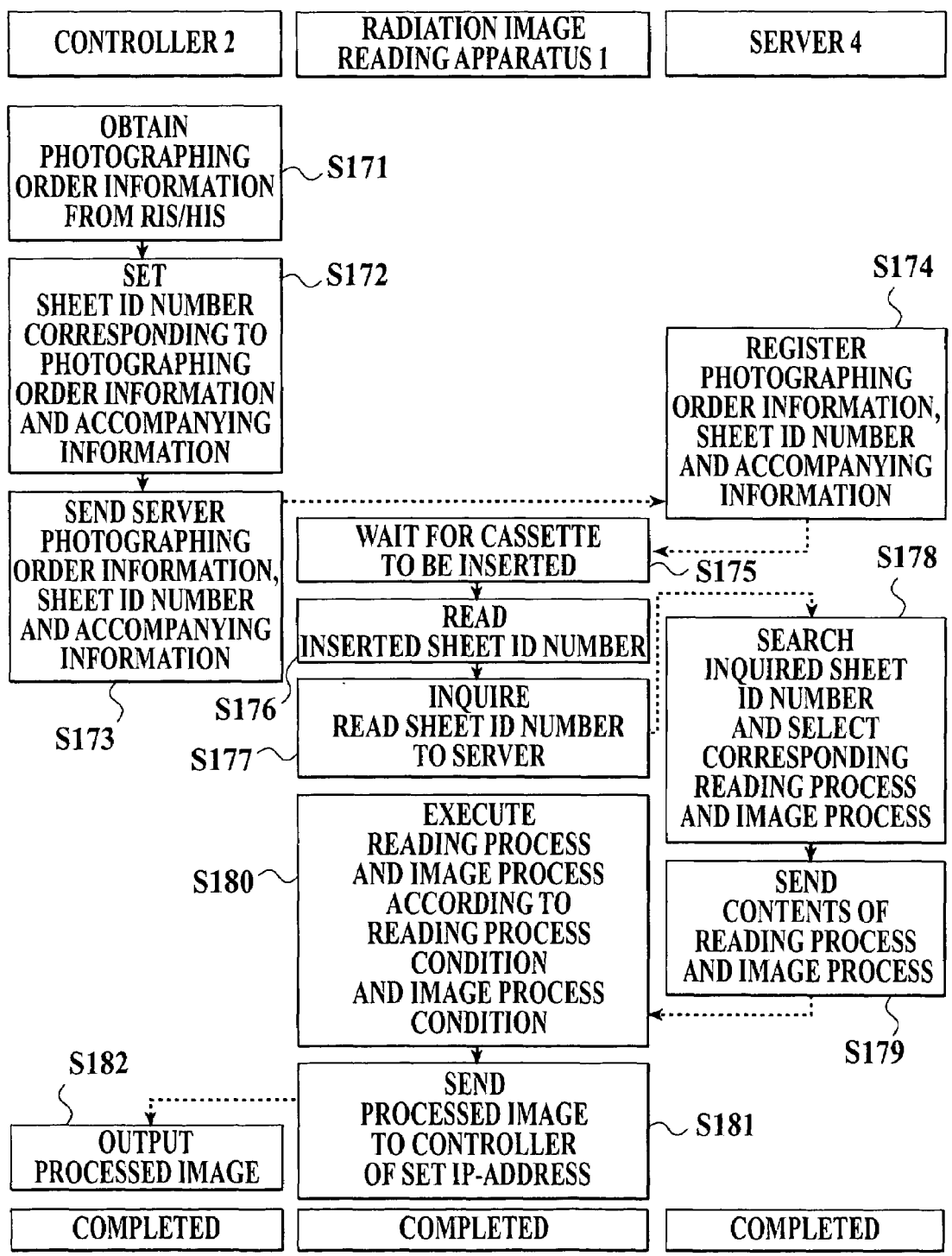
FIG. 4 is a flow chart showing an image process performed by the radiation image photographing system 100.

As shown in FIG. 4, at first, the controller 2 obtains photographing order information from the RIS or the HIS (step S171), and configures the sheet ID number corresponding to the obtained photographing order information and accompanying information such as the photographing information, the patient information, the image process condition, the reading condition or the like corresponding to the sheet ID number (step S172). Then, when the controller 2 sends the server 4 the photographing information, the sheet ID number and the accompanying information (step S173), the server 4 registers the received photographing order information, sheet ID number and accompanying information (step S174).

The radiation image reading apparatus 1 is in a state of waiting for the cassette 6 to be set in (step S175). When the cassette 6 is set in the radiation image reading apparatus 1, the radiation image reading apparatus 1 reads the sheet ID number of the set cassette 6 (step S176). Then, when the radiation image reading apparatus 1 inquires the read sheet ID number to the server 4 (step S177), the server 4 searches the inquired sheet ID number among the registered sheet ID numbers and selects the reading process and the image process corresponding to the sheet ID number (step S178). Then, the server 4 sends the radiation image reading apparatus 1 contents of the reading process and the image process (step S179).

The radiation image reading apparatus 1 executes the reading process and the image process according to the reading process condition and the image process condition configured in the contents of the reading process and the image process sent from the server 4 (step S180). Then, when the radiation image reading apparatus 1 sends the controller 2 having an IP address corresponding to the sheet ID number the processed image (step S181), the controller 2 outputs the processed image (step S182) and completes the image process.

Further, another image process performed by the radiation image photographing system 200 will be explained with reference to a flow chart shown in FIG. 5.

Figure 5:
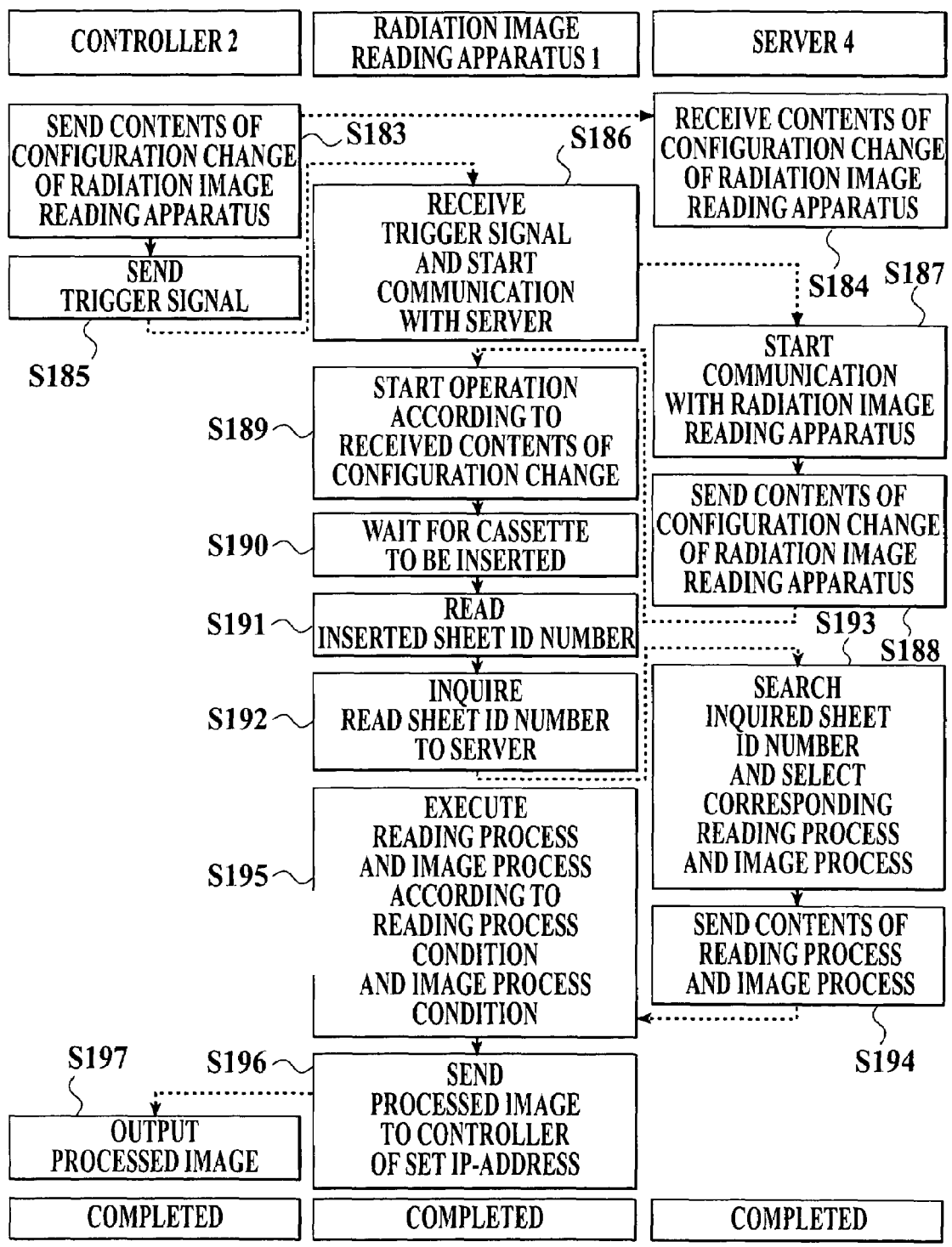
FIG. 5 is a flow chart showing another image process performed by the radiation image photographing system 100.

As shown in FIG. 5, when a configuration of a certain radiation image reading apparatus 1 or each of all the radiation image reading apparatuses 1 connected to the network 3 is changed for use, at first, the controller 2 sends the server 4 contents of change in the configuration of the certain radiation image reading apparatus 1 or each of all the radiation image reading apparatuses 1 (step S183). For example, the controller 2 sends the server 4 an order for upgrading application software, an order for changing the relationship between the photographic part and the image reading condition, an order for changing the parameter of the image process condition, an order for changing a pitch to read pixels or the like. Then, the server 4 receives and stores the contents of change in the configuration of the radiation image reading apparatus 1 sent from the controller 2 in the storage or the like (step S184).

Then, the controller 2 sends the radiation image reading apparatus 1 a trigger signal for establishing communication between the radiation image reading apparatus 1 and the server 4 (step S185). When the radiation image reading apparatus 1 receives the trigger signal sent from the controller 2, the radiation image reading apparatus 1 starts communicating with the server 4 (step S186). When the server 4 starts communicating with the radiation image reading apparatus 1 (step S187), the server 4 sends the radiation image reading apparatus 1 the contents of change in the configuration of the radiation image reading apparatus 1 (step S188). When the radiation image reading apparatus 1 receives the contents of change in the configuration sent from the server 4, the radiation image reading apparatus 1 starts operation according to the contents of change in the configuration (step S189), and waits for the cassette 6 to be set in (step S190).

Since a process performed by the radiation image photographing system 100 after the cassette 6 is set in the radiation image reading apparatus 1 (steps S191-S197) is in the same way as the process shown in FIG. 4 (steps S176-S182), explanation of the process is omitted. In this manner, the radiation image photographing system 100 completes the image process.

Here, when the cassette 6 is set in the radiation image reading apparatus 1 instead of receiving the trigger signal, the radiation image reading apparatus 1 may start communicating with the server 4 and execute the process according to the contents of change in the configuration. In this case, since reading an image from the cassette 6 starts later than the above-mentioned case, preferably, the radiation image reading apparatus 1 starts communicating with the server 4 according to the trigger signal sent from the controller 2.

As explained above, in this embodiment, it is possible to set the cassette 6 having the sheet ID number registered by any one of the controllers 2 in any one of the radiation image reading apparatuses 1 diversely. And, image data read by any one of the radiation image reading apparatuses 1 is automatically returned to the controller 2 which has registered the sheet ID number of the photostimulable phosphor sheet 8 corresponding to the image data.

As mentioned above, since it is possible to set the cassette 6 having the sheet ID number registered by one controller 2 in any one of the plurality of radiation image reading apparatuses 1, it is possible to use an inexpensive radiation image reading apparatus 1 having fewer numbers of sockets for setting the cassettes 6 therein. Accordingly, it is possible to reduce an area for placing the apparatus, reduce installation cost and obtain high expandability.

Further, since it is possible that the plurality of radiation image reading apparatuses 1 read the cassettes having the sheet ID numbers registered by one controller 2, in a hospital where lots of units of photographing on one patient at once are necessary, it is possible to improve transaction ability of the radiation image photographing system.

Further, when m radiation image reading apparatuses 1 capable of having n cassettes 6 set therein are connected, n×m cassettes 6 can be set at once at maximum. Therefore, when lots of cassettes 6 are necessary to be processed at once, it is possible to shorten a photographing cycle period drastically without paying too much attention to setting the cassette 6.

Further, when m radiation image reading apparatuses 1 are connected, since m radiation image reading apparatuses 1 at maximum can simultaneously read image data, a reading period is shortened to 1/m time as much as (the transaction ability improves m times as much as) the case that one radiation image reads apparatus 1 reads image data. Therefore, it is possible to provide a hospital where lots of units of photographing on one patient are necessary or the photographing cycle period is short an ideal operational environment which is efficient and free from operational delay.

Further, when a plurality of radiation image reading apparatuses 1 are used for one patient, since it is possible to input the accompanying information such as the patient information, the photographing condition or the like by one controller 2, the input operation is performed efficiently.

Further, when a plurality of radiation image reading apparatuses 1 are used for one patient, since image data is concentrated to one controller 2 which has registered the patient information and the photographing information of the patient (in other words, the controller 2 which has registered the sheet ID number of the photostimulable phosphor sheet 8 which is to be used for photographing on the patient), the radiologist does not need to move between a terminal for registering the patient information and the photographing information of the patient and a terminal for confirming the image. As a result, it is possible to improve operational efficiency. Further, since it is possible to register the patient information and the photographing information of the patient and confirming the image by one controller 2, it is possible to check the relation between the registered information and the image data. As a result, it is possible to improve operational reliability.

Further, since a plurality of controllers 2 are used, it is possible to place the controller 2 near a location for radiation photographing. Therefore, the radiologist can input the patient information and the photographing information, confirm the image and select the image process condition near the location for radiation photographing. As a result, it is possible to provide an environment that has high operational efficiency and is operated easily.

Further, when one of the plurality of radiation image reading apparatuses 1 is broken down, another non-broken radiation image reading apparatus 1 can substitute for it. As a result, it is possible to provide a reliable system.

Further, since the server 4 manages the photographing database centralizedly, it is possible to refer to the information later. As a result, it is possible to manage a photographing history without a mistake.

Second Embodiment

In the above-described first embodiment, it has been explained that the server 4 has the photographing database and functions as the database section. However, the database section may be incorporated in any one of a plurality of controllers 2, or at least one of other servers, personal computers or the like connected to the network 3 instead of the server 4.

Figure 6:
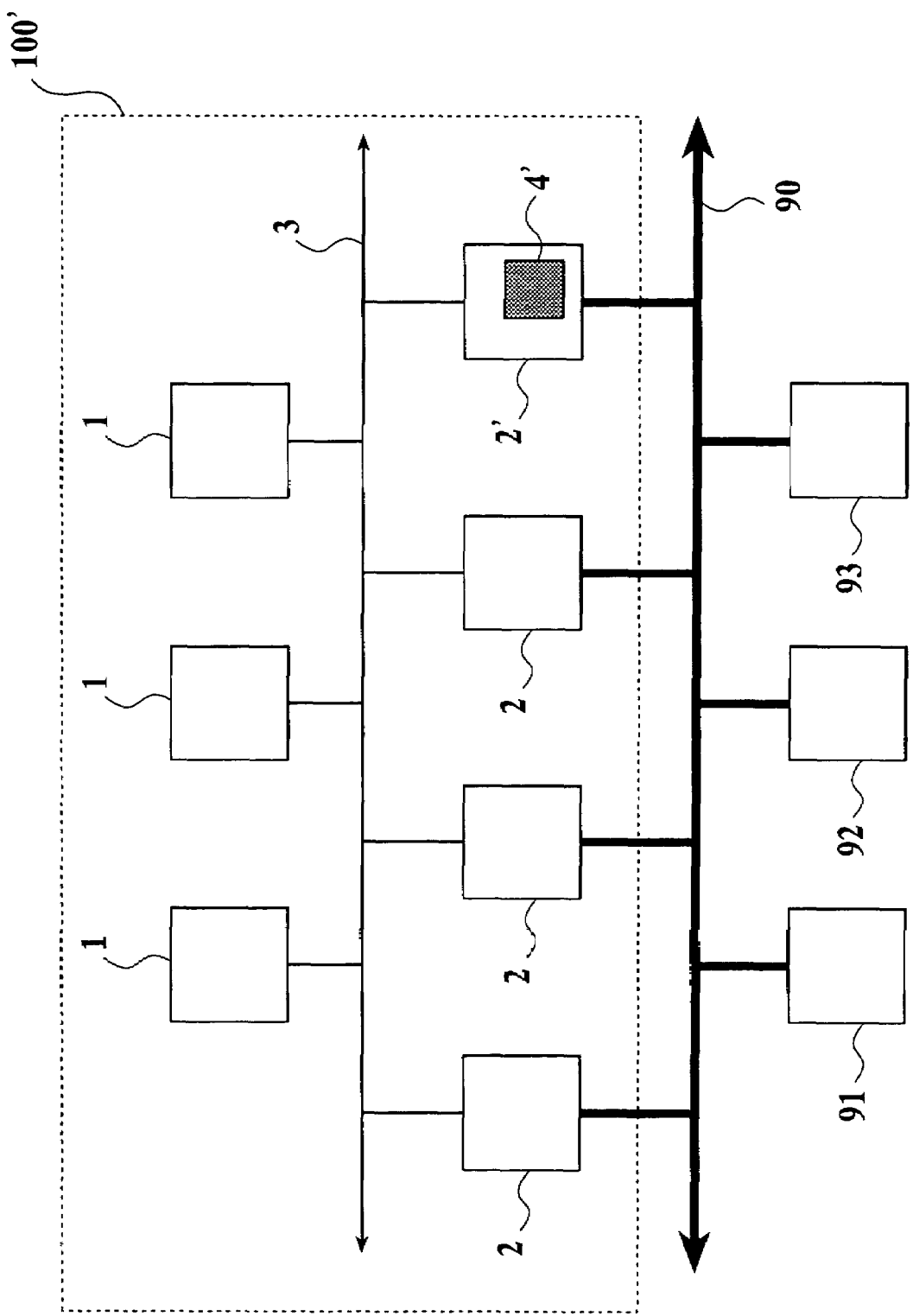
FIG. 6 is a view showing an exemplary structure of the radiation image photographing system 100 in a second embodiment of the present invention.
Figure 7:
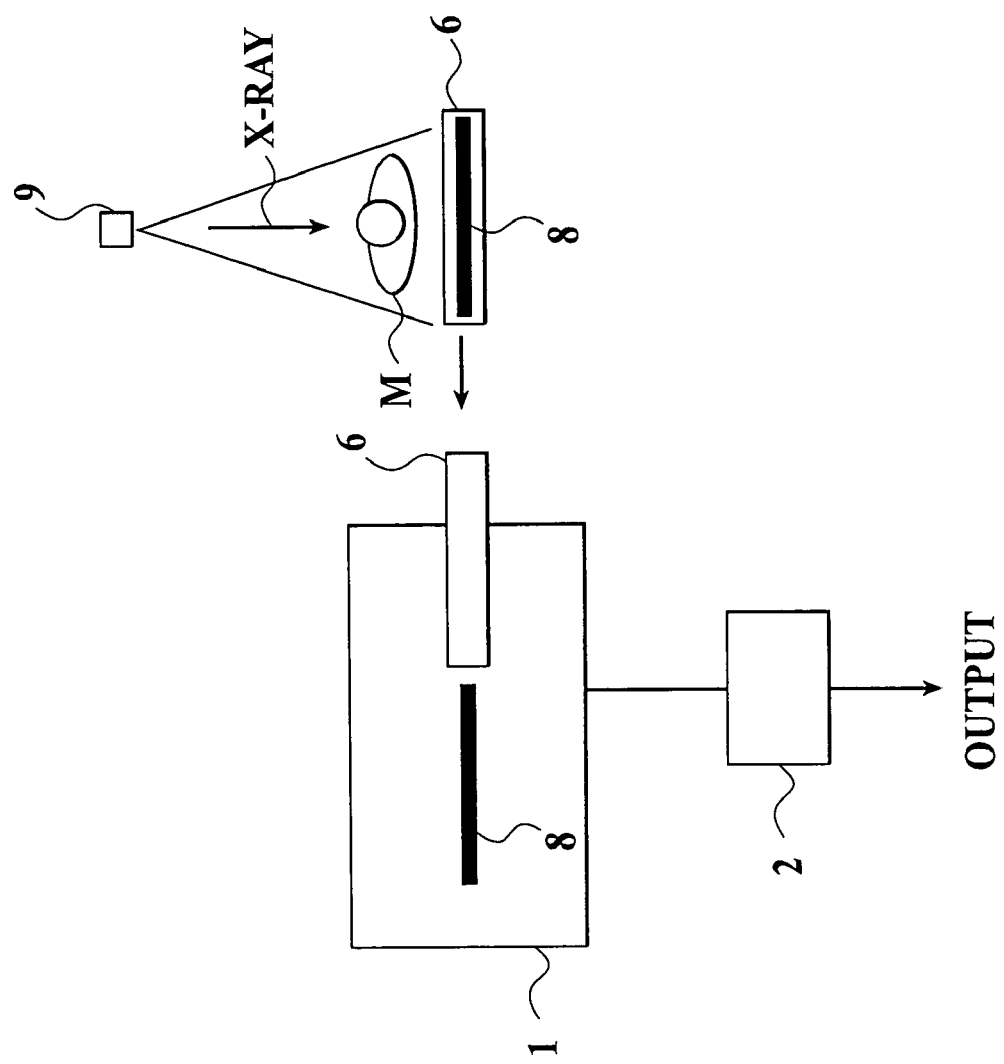
FIG. 7 is a view showing an exemplary structure of a radiation image photographing system of a cassette type in an earlier art.
Figure 8:
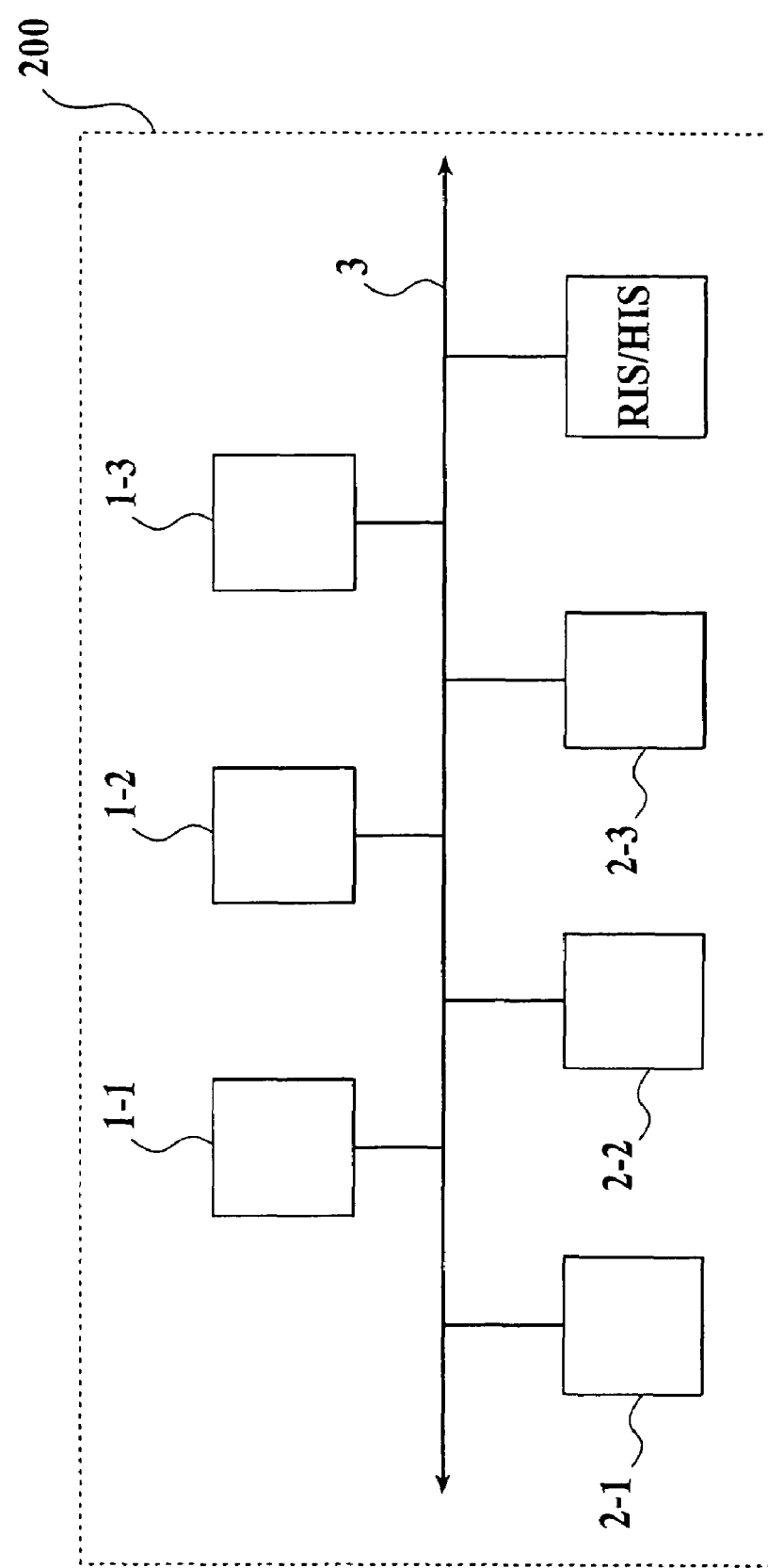
FIG. 8 is a view showing an exemplary structure of a radiation image photographing system 200 in an earlier art.

FIG. 6 is a block diagram showing a radiation image photographing system 100' in a state where a database section 4' is incorporated in a controller 2', which is one of the controllers 2. In the radiation image photographing system 100' shown in FIG. 6, the process executed by the server 4 at the first embodiment is executed by the database section 4' incorporated in the controller 2'. Therefore, explanation of the radiation image photographing system 100' in detail is omitted.

In FIG. 6, the database section 4' is incorporated in the controller 2', which is one of the controllers 2' but a plurality of database sections 4' may be incorporated in a plurality of controllers of the controllers 2. In this case, when the database section 4' incorporated in one controller 2' cannot be used due to a breakdown of the controller 2' or the database section 4' itself incorporated in one controller 2' is broken down, it is still possible for the radiation image photographing system 100' to keep functioning by using a database section 4' of another controller 2'.

As explained above, in the second embodiment, it is possible not only to obtain an advantage of the first embodiment, but also to reduce an area of placing the whole system by incorporating the database section in the controller. As a result, it is possible to reduce installation cost and obtain high expandability.

Further, it is possible to obtain information of the database section from any one of the controllers independent of network load. Further, when a breakdown happens on a certain database section, it is possible for the system to keep functioning.

Further, when the controller incorporating the database section therein is broken down, since a controller incorporating another database section sharing the same database information until the breakdown can substitute for the broken controller incorporating the database section without delay, it is possible to have a reliable system structure.

Further, when the controller always needs to execute a high-load image process, it is possible to have high performance as a whole system by incorporating the database section in the radiation image reading apparatus.

Further, when the database section for controlling a system operation is placed not in the controller but in a dedicated server machine, it is possible to improve operational stability when a comparatively large-sized system is built.

Further, when one of a plurality of dedicated server machines having the database sections therein is broken down, it is possible for the system to keep functioning. As a result, it is possible to improve operational reliability of the system.

Further, when a certain dedicated server machine having the database section is broken down, since a dedicated server machine having another database section sharing the database information until the breakdown can substitute for the broken dedicated server machine having the database section, it is possible to have a highly reliable system structure.

The entire disclosure of Japanese Patent Application Nos. Tokugan 2002-236936 filed on Aug. 15, 2002, and Tokugan 2002-236943 filed on Aug. 15, 2002 including specifications, claims, drawings and summaries are incorporated herein by reference in their entirety.

What is claimed is:

1. A radiation image photographing system comprising a controller, a radiation image generating apparatus and a database section which are connected through a network, the controller comprising:
an operation control information registering section for registering operation control information of the radiation image generating apparatus in the database section, the operation control information including identification information of the controller, an operational order of the radiation image generating apparatus, and identification information of the radiation image generating apparatus,
a receiving section for receiving an image outputted from the radiation image generating apparatus, and
a display section for displaying the image received by the receiving section thereon,
the database section comprising a storing section for storing the operation control information of the radiation image generating apparatus, and
the radiation image generating apparatus comprising:
an obtaining section for obtaining the operation control information from the database section by using the identification information of the radiation image generation apparatus as a search key upon a search order of the database section by the controller, and makes the radiation image generation apparatus operable based on the operation control information, and
an output section for outputting the image based on the operation control information obtained by the obtaining section to the controller determined by the identification information of the controller included in the operation control information.

2. The system of claim 1, wherein the radiation image generating apparatus further comprises a status information registering section for registering at least one of a progress state of operation, success or failure of the operation, and a reason of failure of the operation as status information in the database section when the radiation image generating apparatus executes the operation based on the operation control information according to the search order by the controller, and
the radiation image generating apparatus registers the status information in the database section and gives the controller the search order of the database section.

3. The system of claim 1, wherein the operation control information includes at least one of a staff-up order, a halt order, an order of generating a correction coefficient for a data processing and an order of changing an operational program, to the radiation image generating apparatus.

4. The system of claim 1, further comprising a plurality of controllers,
wherein the database section is incorporated in at least one of the plurality of controllers.

5. The system of claim 1, further comprising a plurality of controllers and a plurality of database sections,
wherein the plurality of database sections are incorporated in a number of controllers among the plurality of controllers corresponding to a number of the plurality of database sections, and
the plurality of database sections exchange and share database information in a predetermined cycle.

6. The system of claim 5, wherein when a database section operating as a master of the plurality of database sections breaks down, any one other than the database section of the plurality of database sections operates as a master.

7. A radiation image photographing system comprising a controller, a radiation image generating apparatus and a database section which are connected through a network,
the controller comprising:
an operation control information registering section for registering operation control information of the radiation image generating apparatus in the database section, the operation control information including identification information of the controller, an operational order of the radiation image generating apparatus, and identification information of the radiation image generating apparatus,
a receiving section for receiving an image outputted from the radiation image generating apparatus, and
a display section for displaying the image received by the receiving section thereon,
the database section comprising a storing section for storing the operation control information of the radiation image generating apparatus, and
the radiation image generating apparatus comprising:
an obtaining section for obtaining the operation control information from the database section by using the identification information of the radiation image generation apparatus as a search key, and
an output section for outputting the image based on the operation control information obtained by the obtaining section to the controller determined by the identification information of the controller included in the operation control information, and
a status information registering section for registering at least one of a progress state of operation, success or failure of the operation, and a reason of failure of the operation as status information in the database section when the radiation image generating apparatus executes the operation based on the operation control information, and
the radiation image generating apparatus registers the status information in the database section and gives the controller the search order of the database section.

8. The system of claim 7, wherein the status information includes a status indicating that the radiation image reading apparatus already has searched the operation control information as the progress situation of the operation.

9. The system of claim 8, wherein the obtaining section can obtain operation control information other than the operation control information which already has been searched by the radiation image generating apparatus from the database section based on the status information.

10. A radiation image photographing method applicable for a radiation image photographing system comprising a controller, a radiation image generating apparatus and a database section which are connected through a network, the method comprising:
registering operation control information of the radiation image generating apparatus in the database section, the operation control information including identification information of the controller, an operational order of the radiation image generating apparatus, and identification information of the radiation image generating apparatus,
outputting an image from the radiation image generating apparatus to the controller,
displaying the image on the controller,
storing the operation control information of the radiation image generating apparatus in the database section, obtaining the operation control information from the database section by using the identification information of the radiation image generating apparatus as a search key upon a search order of the database section, and making the radiation image generating apparatus operable based on the operation control information, and outputting the image based on the obtained operation control information to a controller determined by the identification information of the controller included in the operation control information.

11. The method of claim 10, further comprising:

registering at least one of a progress state of operation, success or failure of the operation, and a reason of failure of the operation as status information in the database section when the radiation image generating apparatus executes the operation based on the operation control information according to the search order by the controller, and registering the status information in the database section and giving the controller the search order of the database section.

12. The method of claim 10, wherein the operation control information includes at least one of a start-up order, a halt order, an order of generating a correction coefficient for a data processing and an order of changing an operational program, to the radiation image generating apparatus.

13. A radiation image photographing method applicable for a radiation image photographing system comprising a controller, a radiation image generating apparatus and a database section which are connected through a network, the method comprising:

registering operation control information of the radiation image generating apparatus in the database section, the operation control information including identification information of the controller, an operational order of the radiation image generating apparatus, and identification information of the radiation image generating apparatus, outputting an image from the radiation image generating apparatus to the controller, displaying the image on the controller, storing the operation control information of the radiation image generating apparatus in the database section, obtaining the operation control information from the database section by using the identification information of the radiation image generating apparatus as a search key, and outputting the image based on the obtained operation control information to a controller determined by the identification information of the controller included in the operation control information, and registering at least one of a progress state of operation, success or failure of the operation, and a reason of failure of the operation as status information in the database section when the radiation image generating apparatus executes the operation based on the operation control information, and registering the status information in the database section and giving the controller the search order of the database section.

14. The method of claim 13, wherein the status information includes a status indicating that the radiation image reading apparatus already has searched the operation control information as the progress situation of the operation.

15. The method of claim 14, wherein the obtaining the operation control information from the database section is possible only when operation control information is other than the operation control information which already has been searched by the radiation image generating apparatus based on the status information.

\* \* \* \* \*